(12) United States Patent
Omagari

(10) Patent No.: US 12,509,826 B2
(45) Date of Patent: Dec. 30, 2025

(54) SEPARATION DEVICE

(71) Applicant: SEIKO EPSON CORPORATION, Tokyo (JP)

(72) Inventor: Naoko Omagari, Nagano (JP)

(73) Assignee: Seiko Epson Corporation, Tokyo (JP)

(*) Notice: Subject to any disclaimer, the term of this patent is extended or adjusted under 35 U.S.C. 154(b) by 14 days.

(21) Appl. No.: 18/150,220

(22) Filed: Jan. 5, 2023

(65) Prior Publication Data

US 2023/0220625 A1    Jul. 13, 2023

(30) Foreign Application Priority Data

Jan. 7, 2022  (JP) ................................ 2022-001963

(51) Int. Cl.
*D21G 9/00* (2006.01)
*D21B 1/02* (2006.01)

(52) U.S. Cl.
CPC .......... *D21G 9/0018* (2013.01); *D21B 1/028* (2013.01)

(58) Field of Classification Search
CPC . B27N 3/04; B27N 3/007; B27N 3/08; B27N 3/18; D21G 9/0018; D21B 1/08; D21F 9/00; Y02W 30/64; B27L 11/08
See application file for complete search history.

(56) References Cited

U.S. PATENT DOCUMENTS

| | | | |
|---|---|---|---|
| 2018/0347115 A1* | 12/2018 | Oguchi | ............... B27N 3/04 |
| 2020/0246836 A1 | 8/2020 | Inagaki et al. | |
| 2020/0307927 A1* | 10/2020 | Tanaka | ............... B65H 5/021 |
| 2020/0399825 A1 | 12/2020 | Motohashi et al. | |

FOREIGN PATENT DOCUMENTS

| | | | |
|---|---|---|---|
| JP | H07-108224 A | 4/1995 | |
| JP | 2020-204116 A | 12/2020 | |

* cited by examiner

*Primary Examiner* — Abbas Rashid
*Assistant Examiner* — Elisa H Vera
(74) *Attorney, Agent, or Firm* — Global IP Counselors, LLP

(57) ABSTRACT

A separation device includes: a material supply section that supplies a material containing a fiber; a defibrating section that defibrates the material supplied from the material supply section; a separation section that includes a rotating member, a suction portion, and a collection section, the rotating member having a first surface and a second surface that are in a front and back relationship, being at least partially composed of a mesh, and to which a defibrated material generated in the defibrating section is supplied onto the first surface, the suction portion being provided on a side of the second surface of the rotating member and sucking the defibrated material via the mesh to remove foreign matter, the collection section collecting the defibrated material from which the foreign matter on the first surface has been removed; a weight detection section that detects a weight of the material supplied by the material supply section; and a controller that controls an operation of the separation section based on a detection result of the weight detection section.

9 Claims, 6 Drawing Sheets

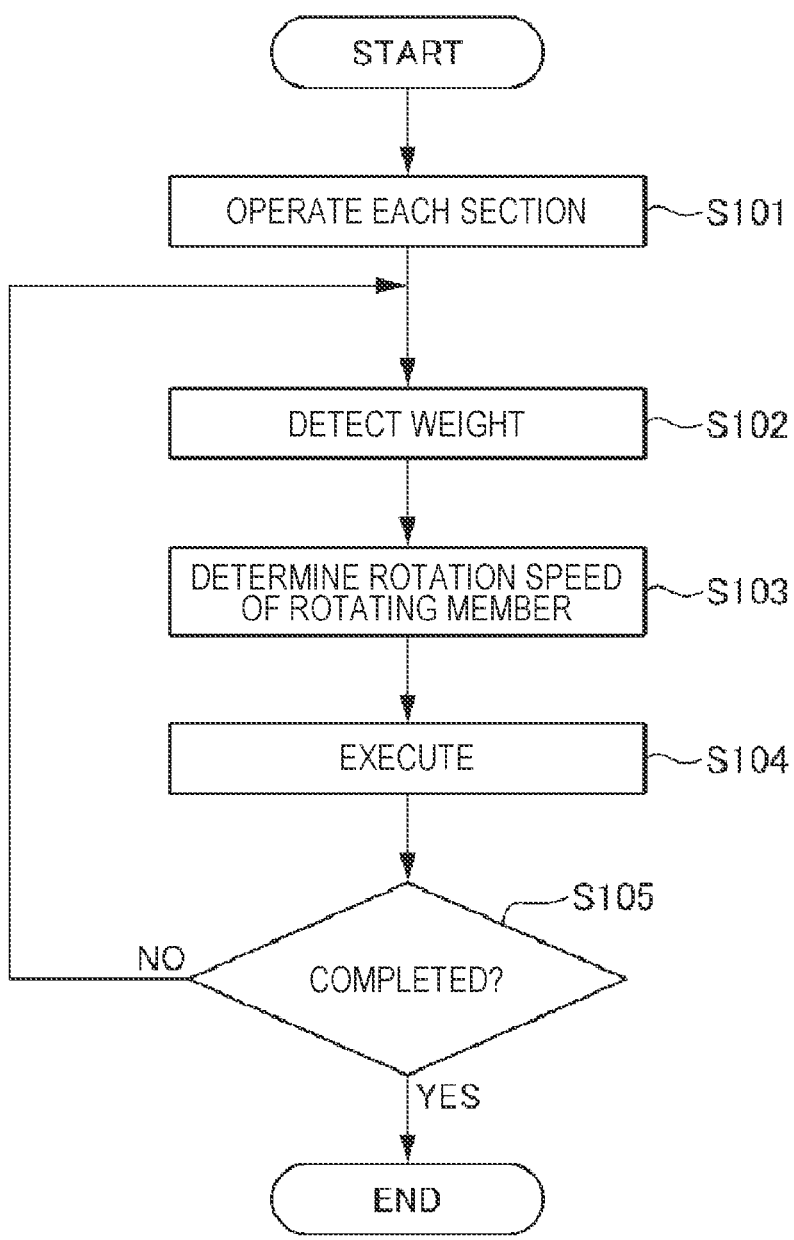

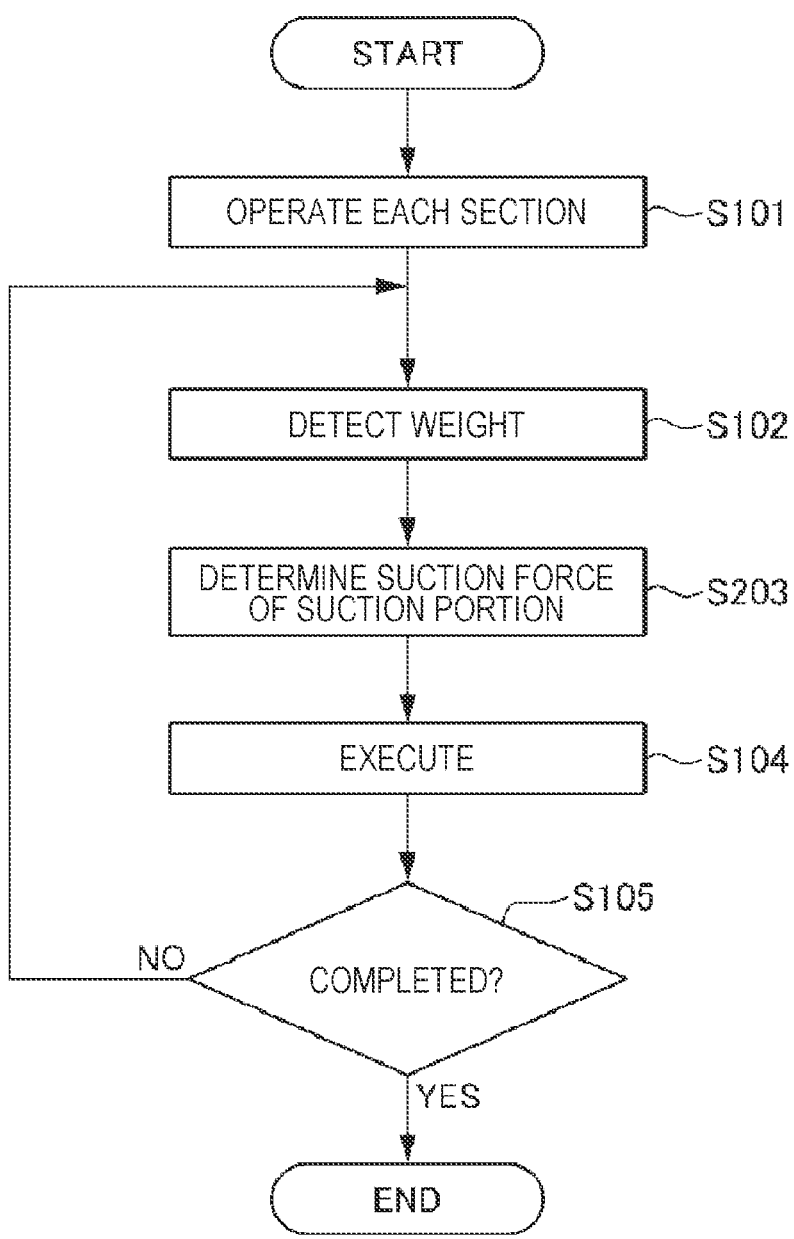

SEPARATION DEVICE

The present application is based on, and claims priority from JP Application Serial Number 2022-001963, filed Jan. 7, 2022, the disclosure of which is hereby incorporated by reference herein in its entirety.

BACKGROUND

1. Technical Field

The present disclosure relates to a separation device.

2. Related Art

In the related art, a separation device that removes foreign matter and the like in supplied material is known (see, for example, JP-A-7-108224).

As shown in FIG. 1 of JP-A-7-108224, this separation device includes a disc-shaped screen 1, an ejection port 2 provided on one surface side of the screen 1, a suction port 3 provided on the opposite side of the ejection port 2 via the screen 1, an ejection port 4 provided on the other surface side of the screen 1 and at a position different from the suction port 3, and a suction port 5 provided on the opposite side of the ejection port 4 via the screen 1.

By supplying a defibrated material from the ejection port 2 onto the screen 1 and performing suction from the suction port 3, excessively fine defibrated materials can be removed. In this case, foreign matter in the defibrated material can also be removed. Further, when the screen 1 rotates, the defibrated material remaining on the screen 1 also moves, and at the destination, the defibrated material is separated from the screen 1 by air ejected from the ejection port 4, and the separated defibrated material can be collected by suction at the suction port 5.

However, in the separation device disclosed in JP-A-7-108224, sufficient research has not been conducted on the operating conditions of the ejection port 2, the suction port 3, the ejection port 4, and the suction port 5, and for example, when there is unevenness in the supply amount of the raw material, unevenness may occur in the ability to remove foreign matter.

SUMMARY

The present disclosure can be realized in the following aspects.

According to an aspect of the present disclosure, there is provided a separation device. The separation device includes: a material supply section that supplies a material containing a fiber; a defibrating section that defibrates the material supplied from the material supply section; a separation section that includes a rotating member, a suction portion, and a collection section, the rotating member having a first surface and a second surface that are in a front and back relationship, being at least partially composed of a mesh, and to which a defibrated material generated in the defibrating section is supplied onto the first surface, the suction portion being provided on a side of the second surface of the rotating member and sucking the defibrated material via the mesh to remove foreign matter, the collection section collecting the defibrated material from which the foreign matter on the first surface was removed; a weight detection section that detects a weight of the material supplied by the material supply section; and a controller that controls an operation of the separation section based on a detection result of the weight detection section.

BRIEF DESCRIPTION OF THE DRAWINGS

FIG. 5 is a flowchart for describing a control operation performed by a controller shown in FIG. 2.

FIG. 6 is a flowchart for describing a control operation performed by the controller provided in the separation device according to the first embodiment of the present disclosure.

DESCRIPTION OF EXEMPLARY EMBODIMENTS

Hereinafter, a separation device according to the present disclosure will be described in detail with reference to a preferred embodiment shown in the accompanying drawings.

First Embodiment

Figure 1:
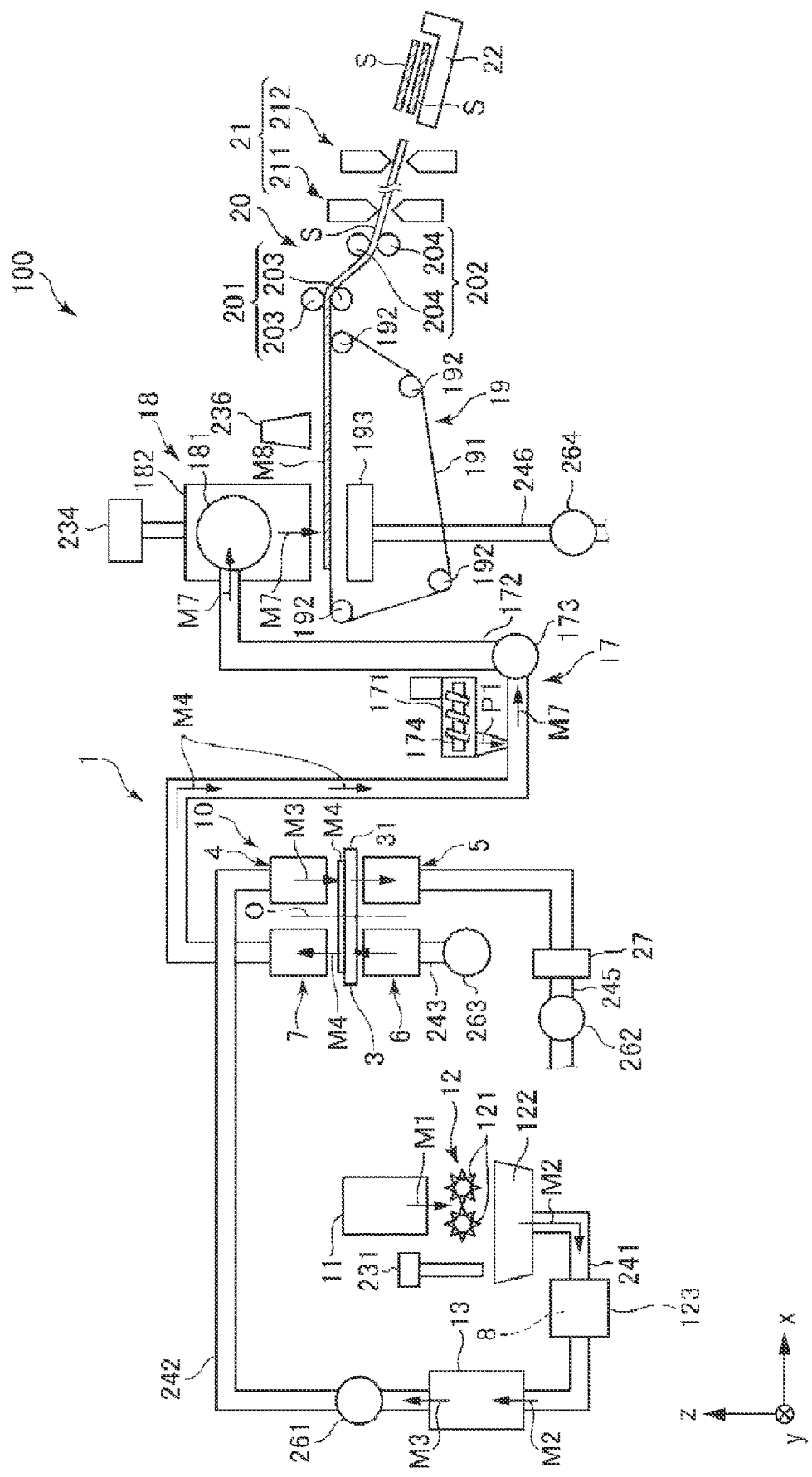
FIG. 1 is a schematic side view showing a sheet manufacturing apparatus including a separation device according to a first embodiment of the present disclosure.
Figure 2:
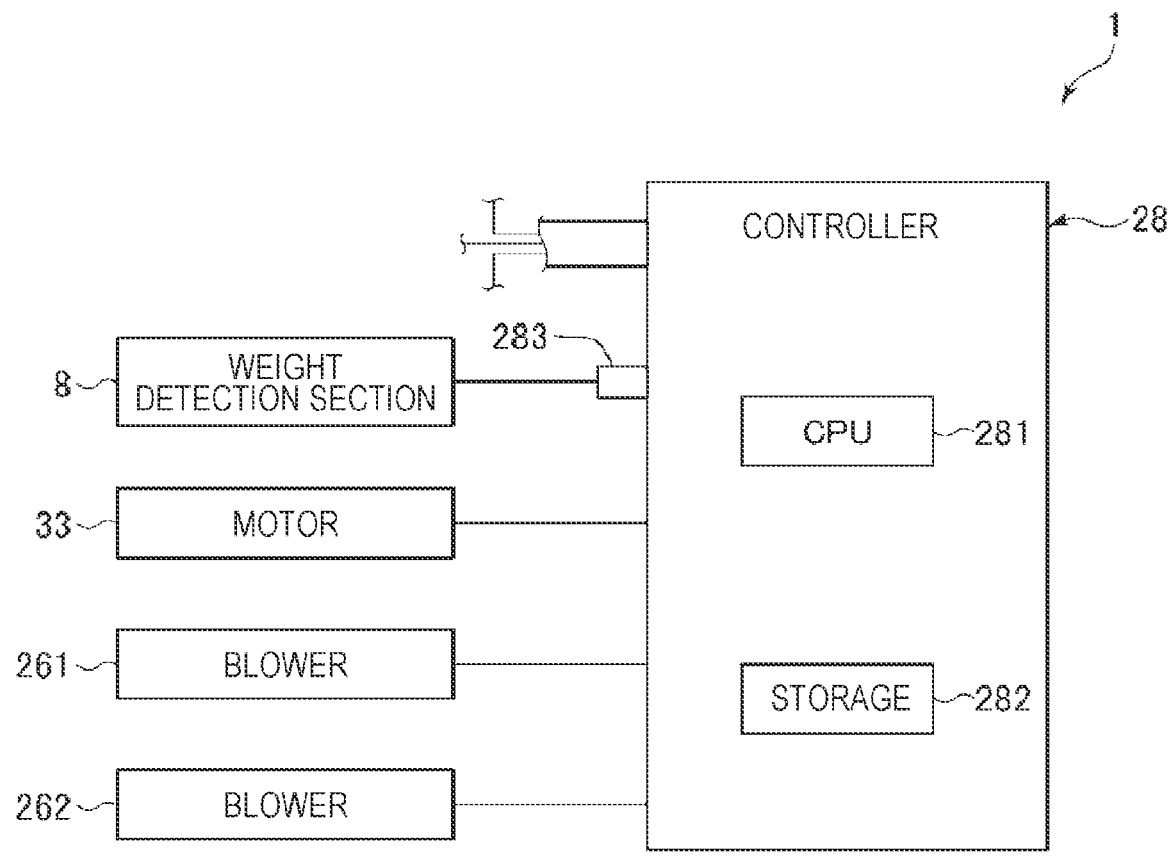
FIG. 2 is a block diagram of the sheet manufacturing apparatus shown in FIG. 1.
Figure 3:
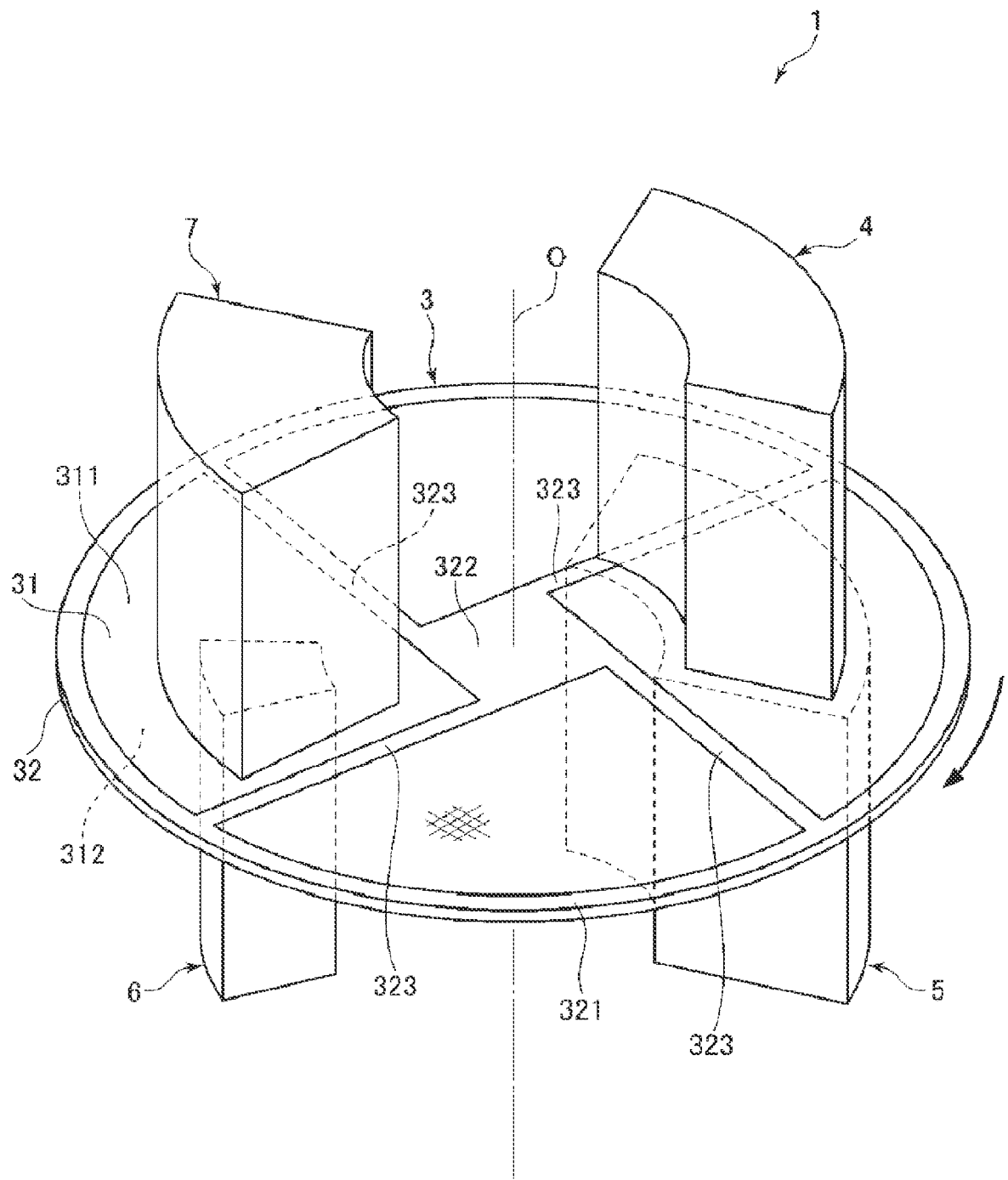
FIG. 3 is a perspective view of the separation device shown in FIG. 1.
Figure 4:
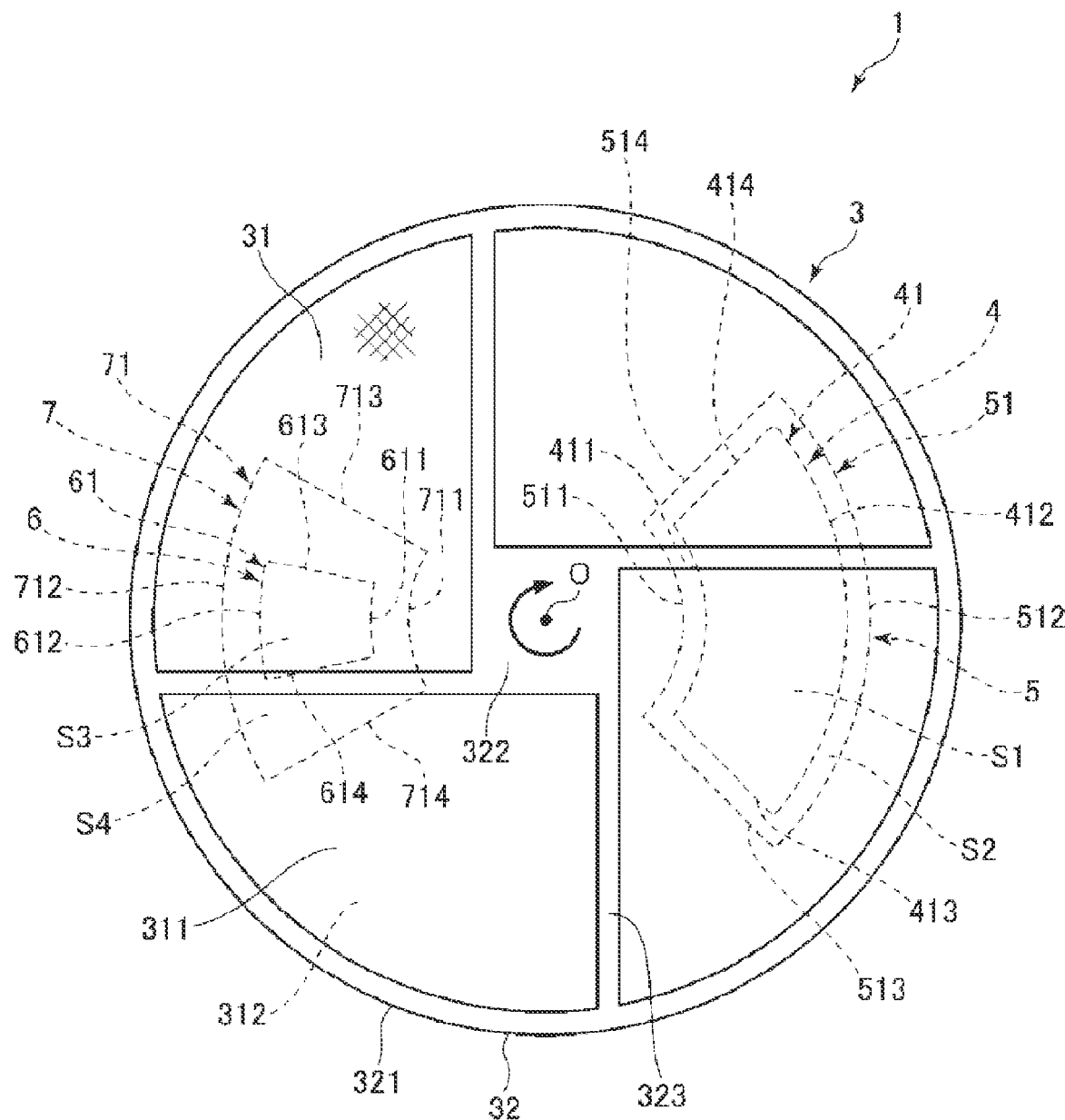
FIG. 4 is a plan view of the separation device shown in FIG. 3.

FIG. 1 is a schematic side view showing a sheet manufacturing apparatus including a separation device according to a first embodiment of the present disclosure. FIG. 2 is a block diagram of the sheet manufacturing apparatus shown in FIG. 1. FIG. 3 is a perspective view of the separation device shown in FIG. 1. FIG. 4 is a plan view of the separation device shown in FIG. 3. FIG. 5 is a flowchart for describing a control operation performed by a controller shown in FIG. 2.

In the following, for convenience of description, as shown in FIG. 1, three axes orthogonal to each other are referred to as an x axis, a y axis, and a z axis. Further, an xy plane including the x axis and the y axis is horizontal, and the z axis is vertical. The direction in which the arrow of each axis is directed is referred to as "+", and the opposite direction is referred to as "−". In FIGS. 1 and 3, an upper side may be referred to as "up" or "above", and a lower side may be referred to as "down" or "below".

As shown in FIGS. 1 and 2, a sheet manufacturing apparatus 100 includes a separation device 1 according to the present disclosure, a mixing section 17, a loosening section 18, a web forming section 19, a sheet forming section 20, a cutting section 21, a stock section 22, and a collection section 27. In addition, the separation device 1 includes a raw material supply section 11, a coarse crushing section 12, a defibrating section 13, a separation section 10, a weight detection section 8, and a controller 28. A material supply section is configured by the raw material supply section 11 and the coarse crushing section 12.

Further, each section of the separation device 1 is electrically coupled to the controller 28, and the operation thereof is controlled by the controller 28. In the present embodiment, the controller 28 included in the separation device 1 is configured to control each section of the sheet manufacturing apparatus 100. However, the present disclosure is not limited thereto, and a controller that controls a part other than the separation device 1 may be separately provided in the sheet manufacturing apparatus 100.

Further, the sheet manufacturing apparatus 100 includes a humidifying section 231, a humidifying section 234, and a humidifying section 236. In addition, the sheet manufacturing apparatus 100 includes a blower 261, a blower 262, a blower 263, and a blower 264. The blower 261, the blower 262, the blower 263, and the blower 264 can change the air volume by changing energization conditions.

Further, in the sheet manufacturing apparatus 100, a raw material supply process, a coarse crushing process, a defibration process, a separation process, a mixing process, a loosening process, a web forming process, a sheet forming process, and a cutting process are executed in this order.

Hereinafter, the configuration of each section will be described.

The raw material supply section 11 performs the raw material supply process which supplies a raw material M1 to the coarse crushing section 12. The raw material M1 is a sheet-like material which consists of a fiber-containing material. In addition, the raw material M1 may be in any form such as woven fabric or non-woven fabric. The raw material M1 may be, for example, recycled paper that is recycled and manufactured by defibrating used paper or YUPO paper (registered trademark) that is synthetic paper, or may not be recycled paper. In the present embodiment, the raw material M1 is used paper that has been used or that is no longer needed.

The coarse crushing section 12 performs a coarse crushing process of coarsely crushing the raw material M1 supplied from the raw material supply section 11 in the atmosphere or the like. The coarse crushing section 12 includes a pair of coarse crushing blades 121, a chute 122, and a fixed-amount supply section 123.

The pair of coarse crushing blades 121 can rotate in mutually opposite directions to coarsely crush the raw material M1 between the coarse crushing blades, that is, cut the raw material to form a coarsely crushed piece M2. The shape and size of the coarsely crushed piece M2 may be suitable for a defibrating process in the defibrating section 13, are preferably a small piece having a side length of 100 mm or less, and more preferably a small piece having a side length of 10 mm or more and 70 mm or less, for example.

The chute 122 is disposed below the pair of coarse crushing blades 121 and has, for example, a funnel shape. Accordingly, the chute 122 can receive the coarsely crushed piece M2 which is coarsely crushed by the coarse crushing blade 121 and fell.

Further, the humidifying section 231 is disposed above the chute 122 so as to be adjacent to the pair of coarse crushing blades 121. The humidifying section 231 humidifies the coarsely crushed piece M2 in the chute 122. The humidifying section 231 has a filter (not shown) containing moisture, and includes a vaporization type or hot air vaporization type humidifier that supplies humidified air with increased humidity to the coarsely crushed piece M2 by passing air through the filter. By supplying the humidified air to the coarsely crushed piece M2, it is possible to prevent the coarsely crushed piece M2 from adhering to the chute 122 and the like due to static electricity.

The chute 122 is coupled to the defibrating section 13 via a pipe 241. The coarsely crushed piece M2 collected on the chute 122 passes through the pipe 241 and is transported to the fixed-amount supply section 123.

Although not shown, the fixed-amount supply section 123 includes a storage portion that temporarily stores the coarsely crushed piece M2, a weighing portion that weights the coarsely crushed piece M2 discharged from the storage portion, and a discharge portion that discharges the coarsely crushed piece M2 when the coarsely crushed piece M2 in the weighing portion reaches a set weight. In the present embodiment, the load cell of the weighing portion constitutes the weight detection section 8. Thus, according to the fixed-amount supply section 123, it is possible to intermittently discharge the set weight and send it out to the defibrating section 13 quantitatively.

As shown in FIG. 2, the weight detection section 8 is electrically coupled to the controller 28, and information on the detection result detected by the weight detection section is transmitted to the controller 28 as an electric signal.

The defibrating section 13 performs a defibrating process of defibrating the coarsely crushed piece M2 in the air, that is, in a dry manner. By the defibrating process in the defibrating section 13, a defibrated material M3 can be generated from the coarsely crushed piece M2. Here, "defibrating" means unraveling the coarsely crushed piece M2 formed by binding a plurality of fibers into individual fibers. Then, the unraveled material is the defibrated material M3. The shape of the defibrated material M3 is linear or band shape. Further, the defibrated material M3 may exist in an entangled and lumpy state, that is, in a state of forming a so-called "lump".

In the present embodiment, for example, the defibrating section 13 includes an impeller mill having a rotor that rotates at a high speed and a liner that is located on the outer periphery of the rotor. The coarsely crushed piece M2 flowing into the defibrating section 13 is defibrated by being pinched between the rotor and the liner.

Further, the defibrating section 13 can generate a flow of air from the coarse crushing section 12 toward the separation device 1, that is, an air flow, by rotation of the rotor. Accordingly, it is possible to suck the coarsely crushed piece M2 to the defibrating section 13 from the pipe 241. After the defibrating process, the defibrated material M3 can be sent out to the separation device 1 via the pipe 242.

The blower 261 is installed in the middle of the pipe 242. The blower 261 is an air flow generation device that generates an air flow toward the separation device 1. Accordingly, sending out the defibrated material M3 to the separation device 1 is promoted.

The separation device 1 is a device that performs a separation process of selecting the defibrated material M3 based on the length of the fiber and removing foreign matter in the defibrated material M3. The configuration of the separation device 1 will be described in detail later. The defibrated material M3 becomes a defibrated material M4 from which foreign matter such as coloring material is removed by passing through the separation device 1, and which includes fibers having a length equal to or longer than a predetermined length, that is, fibers having a length suitable for sheet manufacturing. The defibrated material M4 is sent out to the mixing section 17 downstream.

The mixing section 17 is disposed downstream of the separation device 1. The mixing section 17 performs a mixing process which mixes the defibrated material M4 and a binder P1. The mixing section 17 includes a binder supply portion 171, a pipe 172, and a blower 173.

The pipe 172 couples a second suction portion 7 of the separation device 1 and a housing portion 182 of the loosening section 18 to each other and is a flow path through which a mixture M7 of the defibrated material M4 and the binder P1 passes.

The binder supply portion 171 is coupled in the middle of the pipe 172. The binder supply portion 171 includes a screw feeder 174. When the screw feeder 174 is rotationally driven, the binder P1 can be supplied to the pipe 172 as powder or particles. The binder P1 supplied to the pipe 172 is mixed with the defibrated material M4 to become the mixture M7.

The binder P1 binds fibers to each other in a later process. Examples of the binder include a natural product-derived component such as starch, dextrin, glycogen, amylose, hyaluronic acid, kudzu, konjac, potato starch, etherified starch, esterified starch, natural gum glue (etherified tamarind gum, etherified locust bean gum, etherified guar gum, acacia arabic gum), fiber-inducing glue (etherified carboxymethyl cellulose, hydroxyethyl cellulose), seaweeds (sodium alginate, agar), and animal proteins (collagen, gelatin, hydrolyzed collagen, sericin), polyvinyl alcohol, polyacrylic acid, polyacrylamide, and the like, and one or more selected from these can be used in combination. However, a natural product-derived component is preferably used, and starch is more preferably used. A thermoplastic resin can also be used. Examples of the thermoplastic resin include an AS resin, an ABS resin, polyolefin such as polyethylene, polypropylene, or an ethylene-vinyl acetate copolymer (EVA), modified polyolefin, an acrylic resin such as polymethyl methacrylate, polyvinyl chloride, polystyrene, polyester such as polyethylene terephthalate and polybutylene terephthalate, polyamide (nylon) such as nylon 6, nylon 46, nylon 66, nylon 610, nylon 612, nylon 11, nylon 12, nylon 6-12, and nylon 6-66, polyphenylene ether, polyacetal, polyether, polyphenylene oxide, polyetheretherketone, polycarbonate, polyphenylene sulfide, thermoplastic polyimide, polyetherimide, a liquid crystal polymer such as aromatic polyester, various thermoplastic elastomers such as a styrene-based thermoplastic elastomer, a polyolefin-based thermoplastic elastomer, a polyvinyl chloride-based thermoplastic elastomer, a polyurethane-based thermoplastic elastomer, a polyester-based thermoplastic elastomer, a polyamide-based thermoplastic elastomer, a polybutadiene-based thermoplastic elastomer, a trans polyisoprene-based thermoplastic elastomer, a fluoro rubber-based thermoplastic elastomer, and a chlorinated polyethylene-based thermoplastic elastomer, and the like, and one or more selected from these can be used in combination. Preferably, as the thermoplastic resin, polyester or a composition containing the polyester is used.

In addition to the binder P1, a colorant for coloring the fiber, an aggregation inhibitor for inhibiting aggregation of the fiber or aggregation of the binder P1, a flame retardant for making the fiber difficult to burn, a paper strengthening agent for enhancing the paper strength of sheet S, and the like may be supplied from the binder supply portion 171. Alternatively, the above-mentioned colorant, aggregation inhibitor, flame retardant, and paper strengthening agent are contained and compounded in the binder P1 in advance, and then the resultant may be supplied from the binder supply portion 171.

In the middle of the pipe 172, the blower 173 is installed downstream of the binder supply portion 171. The defibrated material M4 and the binder P1 are mixed by the action of a rotating portion such as a blade of the blower 173. Further, the blower 173 can generate an air flow toward the loosening section 18. With the air flow, the defibrated material M4 and the binder P1 can be stirred in the pipe 172. Accordingly, the mixture M7 can flow into the loosening section 18 in a state where the defibrated material M4 and the binder P1 are uniformly dispersed. Further, the defibrated material M4 in the mixture M7 is loosened in the process of passing through the pipe 172, and has a finer fibrous shape.

The loosening section 18 performs a loosening process of loosening the mutually entangled fibers in the mixture M7. The loosening section 18 includes a drum portion 181 and the housing portion 182 that houses the drum portion 181.

The drum portion 181 is a sieve that is formed of a cylindrical net body and that rotates around its central axis. The mixture M7 flows into the drum portion 181. When the drum portion 181 rotates, fibers or the like smaller than the opening of the net in the mixture M7 can pass through the drum portion 181. At that time, the mixture M7 is loosened.

The housing portion 182 is coupled to the humidifying section 234. The humidifying section 234 includes a vaporization type humidifier similar to the humidifying section 231. Accordingly, the humidified air is supplied into the housing portion 182. The inside of the housing portion 182 can be humidified with the humidified air, so that the mixture M7 can be prevented from adhering to the inner wall of the housing portion 182 by electrostatic force.

Further, the mixture M7 loosened in the drum portion 181 falls while being dispersed in the air, and travels to the web forming section 19 located below the drum portion 181. The web forming section 19 performs a web forming process of forming a web M8 from the mixture M7. The web forming section 19 includes a mesh belt 191, tension rollers 192, and a suction portion 193.

The mesh belt 191 is an endless belt, and the mixture M7 is accumulated thereon. The mesh belt 191 is wound around four tension rollers 192. When the tension rollers 192 are rotationally driven, the mixture M7 on the mesh belt 191 is transported downstream.

Further, most of the mixture M7 on the mesh belt 191 has a size equal to or larger than the opening of the mesh belt 191. Accordingly, the mixture M7 is restricted from passing through the mesh belt 191 and can thus be accumulated on the mesh belt 191. Since the mixture M7 is transported downstream with the mesh belt 191 in a state where the mixture is accumulated on the mesh belt 191, the mixture is formed as the layered web M8.

The suction portion 193 is a suction mechanism that sucks air from below the mesh belt 191. Accordingly, the mixture M7 can be sucked onto the mesh belt 191, and thus the accumulation of the mixture M7 onto the mesh belt 191 is promoted.

A pipe 246 is coupled to the suction portion 193. Further, the blower 264 is installed in the middle of the pipe 246. By the operation of the blower 264, a suction force can be generated at the suction portion 193.

The humidifying section 236 is disposed downstream of the loosening section 18. The humidifying section 236 includes an ultrasonic humidifier. Accordingly, moisture can be supplied to the web M8, and thus the amount of moisture of the web M8 is adjusted. By the adjustment, adsorption of the web M8 to the mesh belt 191 due to electrostatic force can be suppressed. Accordingly, the web M8 is easily peeled off from the mesh belt 191 at a position where the mesh belt 191 is folded back by the tension roller 192.

The total content of moisture added from the humidifying section 231 to the humidifying section 236 is preferably 0.5 parts by mass or more and 20 parts by mass or less with respect to 100 parts by mass of the material before humidification, for example.

The sheet forming section 20 is disposed downstream of the web forming section 19. The sheet forming section 20 performs a sheet forming process of forming the sheet S from the web M8. The sheet forming section 20 includes a pressurizing portion 201 and a heating portion 202.

The pressurizing portion 201 includes a pair of calender rollers 203 and can pressurize the web M8 between the calender rollers 203 without heating the web M8. Accordingly, the density of the web M8 is increased. As an extent of the heating in this case, for example, it is preferable that the binder P1 is not melted. The web M8 is transported toward the heating portion 202. Note that, one of the pair of calender rollers 203 is a main driving roller which is driven by the operation of a motor (not shown), and the other is a driven roller.

The heating portion 202 is used when a thermoplastic resin is used as a binder. The heating portion 202 includes a pair of heating rollers 204 and can pressurize the web M8 between the heating rollers 204 while heating the web M8. By the heat and pressurization, the binder P1 is melted in the web M8, and the fibers are bound to each other via the melted binder P1. Accordingly, the sheet S is formed. The sheet S is transported toward the cutting section 21. Note that, one of the pair of heating rollers 204 is a main driving roller which is driven by the operation of the motor (not shown), and the other is a driven roller.

The cutting section 21 is disposed downstream of the sheet forming section 20. The cutting section 21 performs a cutting process of cutting the sheet S. The cutting section 21 includes a first cutter 211 and a second cutter 212.

The first cutter 211 cuts the sheet S in a direction that intersects with the transport direction of the sheet S, particularly in a direction orthogonal thereto.

The second cutter 212 cuts the sheet S in a direction parallel to the transport direction of the sheet S downstream of the first cutter 211. The cutting is a process of removing unnecessary portions at both ends of the sheet S, that is, the ends in the +y axis direction and the −y axis direction to adjust the width of the sheet S. In addition, the portion that has been removed by the cutting is referred to as a so-called "edge".

By cutting the first cutter 211 and the second cutter 212 as described above, the sheet S having a desired shape and size can be obtained. The sheet S is transported further downstream and accumulated in the stock section 22.

Next, the separation device 1 will be described.

As shown in FIGS. 1 to 3, the separation device 1 includes the raw material supply section 11, the coarse crushing section 12, the defibrating section 13, the separation section 10, the weight detection section 8, and the controller 28 described above. The separation section 10 includes a rotating member 3 having a mesh 31, a first ejection portion 4 that ejects and supplies the defibrated material M3 with air onto the mesh 31, a first suction portion 5 (suction portion) that sucks a part of the defibrated material M3 on the mesh 31, a second ejection portion 6 that ejects air to the defibrated material M4 generated by suction, a second suction portion 7 that sucks and collects the defibrated material M4, and a motor 33. Further, the rotating member 3, the second ejection portion 6, and the second suction portion 7 constitute a collection section that collects the defibrated material M4 that is a material remaining on a first surface 311.

As shown in FIG. 3, the rotating member 3 includes the mesh 31 that has a circular shape in plan view, and a support member 32 that supports the mesh 31.

The mesh 31 has the first surface 311 and a second surface 312 in a front and back relationship. In the present embodiment, the first surface 311 is an upper surface facing vertically upward, and the second surface 312 is a lower surface facing vertically downward.

The mesh 31 can be, for example, a linear body knitted in a net shape, or a disc-shaped member provided with a plurality of through-holes. Among the fibers of the defibrated material M3 supplied onto the first surface 311 of the mesh 31, the fibers longer than the size of the opening of the mesh 31 remain on the mesh 31, that is, are accumulated on the mesh, and the fibers shorter than the size of the opening of the mesh 31 or minute foreign matter such as coloring materials pass through the mesh 31. Then, by setting the opening of the mesh 31 to a desired size, for example, fibers having a length suitable for sheet manufacturing can be selectively left.

The support member 32 has a function of supporting the mesh 31 to maintain the flat shape of the mesh 31. In the present embodiment, the support member 32 supports the mesh 31 from the first surface 311 side of the mesh 31. The mesh 31 and the support member 32 are at least partially fixed, and when the support member 32 is rotated by the operation of the motor 33, the mesh 31 is rotated together with the support member.

As shown in FIG. 4, the support member 32 includes a ring-shaped frame body 321 that supports the edge of the mesh 31, a central support portion 322 that supports the center portion of the mesh 31, and a plurality of rod-like coupling portions 323 that couple the frame body 321 and the central support portion 322 to each other.

In the present embodiment, the coupling portion 323 has a straight bar shape in which the cross-sectional shape is a quadrangular prism shape. In other words, the coupling portion 323 is an elongated member extending across the mesh 31 from the center portion to the outer peripheral portion. Further, in the present embodiment, four coupling portions 323 are provided radially, that is, at equal intervals along the circumferential direction of the mesh 31. The shape of the coupling portion 323 is not limited to the above-described configuration, for example, any shape such as a round bar shape may be used.

Such a rotating member 3 is coupled to the motor 33 that is a driving portion, and can rotate around a central axis O by the operation of the motor 33. The motor 33 is configured so that the rotation speed is variable depending on the energization condition, and the operation of the motor is controlled by the controller 28. In the present embodiment, the rotating member 3 rotates in the arrow direction in FIG. 4, that is, in the clockwise direction when viewed from the first surface 311 side.

The first ejection portion 4 is installed on the first surface 311 side of the mesh 31. In the present embodiment, as shown in FIG. 1, the first ejection portion 4 is installed on the right side of the central axis O of the mesh 31 when viewed from the −y axis side toward the +y axis direction. The first ejection portion 4 is coupled to the downstream end of the pipe 242 and includes a first ejection port 41 at a position facing the first surface 311 of the mesh 31. With the air flow generated by the blower 261, the first ejection portion 4 ejects the defibrated material M3 together with the air flowed through the first ejection port 41 toward the mesh 31 from above, that is, toward the second surface 312 from the first surface 311 side. Accordingly, the defibrated material M3 can be supplied and accumulated on the first surface 311 of the mesh 31.

The first ejection port 41 is installed away from the first surface 311 of the mesh 31. Accordingly, the defibrated material M4 accumulated on the first surface 311 of the mesh 31 can move with the rotation of the mesh 31.

The first ejection port 41 has a shape where an opening surface thereof extends along the circumferential direction of the mesh 31. That is, the first ejection port 41 has a shape having a circular arc 411 located on the center side of the mesh 31, a circular arc 412 closer to the outer peripheral side of the circular arc 411, and a line segment 413 and a line segment 414 which couple the ends of the circular arcs to each other, in plan view of the opening surface of the first ejection port 41. The circular arc 411 and the circular arc 412 are provided in the circumferential direction of the mesh 31, and the circular arc 412 is longer than the circular arc 411. Further, the line segment 413 and the line segment 414 are arranged in this order from the front in the rotation direction of the mesh 31, and are provided in the radial direction of the mesh 31.

By supplying the defibrated material M3 from the first ejection port 41 having such a shape onto the first surface 311 of the mesh 31, the defibrated material M3 can be supplied and accumulated in the rotation direction of the mesh 31.

The first suction portion 5 is provided on the second surface 312 side of the mesh 31 and on the opposite side of the first ejection portion 4 via the mesh 31. The first suction portion 5 includes a first suction port 51, and is installed at a position where the first suction port 51 overlaps the first ejection port 41 when viewed from the direction of the central axis O of the mesh 31. Further, the first suction portion 5 is coupled to the blower 262 via a pipe 245, and air can be sucked from the first suction port 51 by the operation of the blower 262. Further, the collection section 27 formed of, for example, a filter is provided upstream of the pipe 245 from the blower 262. Accordingly, the fiber or the foreign matter sucked by the first suction portion 5 can be captured and collected.

The first suction port 51 has a shape where an opening surface thereof extends along the circumferential direction of the mesh 31. That is, the first suction port 51 has a shape having a circular arc 511 located on the center side of the mesh 31, a circular arc 512 closer to the outer peripheral side than the circular arc 511, and a line segment 513 and a line segment 514 which couple the ends of the circular arcs to each other, in plan view of the opening surface of the first suction port 51. The circular arc 511 and the circular arc 512 are provided in the circumferential direction of the mesh 31, and the circular arc 512 is longer than the circular arc 511. Further, the line segment 513 and the line segment 514 are arranged in this order from the front in the rotation direction of the mesh 31, and are provided in the radial direction of the mesh 31.

In other words, the first suction port 51 which is a suction port has a shape having a portion whose opening width increases from the center portion of the mesh toward the outer peripheral side thereof. The defibrated material M3 or the defibrated material M4 on the mesh 31 moves at a higher movement speed in the circumferential direction of the mesh 31 as it goes to the outer peripheral side of the mesh 31. However, with the above configuration, the defibrated material M3 or the defibrated material M4 can be sufficiently sucked even on the outer peripheral side. Note that, the opening width in this case refers to the length in the direction along the circular arc 511 or the circular arc 512.

By sucking the defibrated material M3 from the first suction port 51, the defibrated material M3 accumulated in the rotation direction of the mesh 31 can be sucked via the mesh 31. Therefore, suction can be performed according to the shape of the accumulated material of the defibrated material M3 accumulated on the mesh 31, and the removal of foreign matter and the removal of short fibers in the defibrated material M3 can be performed uniformly.

The second ejection portion 6 is installed on the second surface 312 side of the mesh 31 and at a position different from the first suction portion 5, that is, in front of the first suction portion 5 in the rotation direction of the mesh 31. In the present embodiment, as shown in FIG. 1, the second ejection portion 6 is installed on the left side of the central axis O of the mesh 31 when viewed from the +y axis side toward the −y axis side. The second ejection portion 6 includes a second ejection port 61 at a position facing the second surface 312 of the mesh 31. The second ejection portion 6 is coupled to the blower 263 via a pipe 243, and an air flow can be generated by the operation of the blower 263 and the air can be ejected from the second ejection port 61. Further, the second ejection port 61 ejects the air from the second surface 312 side of the mesh 31 toward the defibrated material M4 on the first surface 311 via the mesh 31. Accordingly, the defibrated material M4 on the mesh 31 can be peeled off from the first surface 311 of the mesh 31. Accordingly, the defibrated material M4 can be effectively collected by suction by the second suction portion 7 which will be described later.

The second ejection port 61 has a shape where an opening surface thereof curves along the circumferential direction of the mesh 31. That is, the second ejection port 61 has a shape having a circular arc 611 located on the center side of the mesh 31, a circular arc 612 closer to the outer peripheral side than the circular arc 611, and a line segment 613 and a line segment 614 which couple the ends of the circular arcs to each other, in plan view of the opening surface of the second ejection port 61. The circular arc 611 and the circular arc 612 are provided in the circumferential direction of the mesh 31, and the circular arc 612 is longer than the circular arc 611. Further, the line segment 613 and the line segment 614 are arranged in this order from the front in the rotation direction of the mesh 31, and are provided in the radial direction of the mesh 31.

By ejecting the air from the second ejection port 61 having such a shape toward the defibrated material M4 on the mesh 31, the defibrated material M4 can be peeled off and separated from the mesh 31 in the rotation direction of the mesh 31.

The second suction portion 7 is installed on the first surface 311 side of the mesh 31 and at a position different from the first ejection portion 4, that is, in front of the first ejection portion 4 in the rotation direction of the mesh 31. The second suction portion 7 has a second suction port 71 at a position facing the first surface 311 of the mesh 31, and is installed at a position where the second suction port 71 overlaps the second ejection port 61 when viewed from the direction of the central axis O of the mesh 31. The second suction portion 7 is coupled to the upstream end of the pipe 172 of the mixing section 17. Further, the air flow is generated by the operation of the blower 173 provided in the middle of the pipe 172, and suction can be performed from the second suction port 71. Accordingly, the defibrated material M4 peeled off from the mesh 31 by the second ejection portion 6 can be sucked and collected, and the defibrated material M4 can be sent out downstream, that is, to the mixing section 17.

The second suction port 71 is installed away from the first surface 311 of the mesh 31. Accordingly, it is possible to prevent the suction force of the second suction portion 7 from inhibiting the rotation of the mesh 31, which contributes to the smooth rotation of the mesh 31.

The second suction port 71 has a shape in which an opening surface thereof curves along the circumferential direction of the mesh 31. That is, the second suction port 71 has a shape having a circular arc 711 located on the center side of the mesh 31, a circular arc 712 closer to the outer peripheral side than the circular arc 711, and a line segment 713 and a line segment 714 which couple the ends of the circular arcs to each other, in plan view of the opening surface of the second suction port 71. The circular arc 711 and the circular arc 712 are provided in the circumferential direction of the mesh 31, and the circular arc 712 is longer than the circular arc 711. Further, the line segment 713 and the line segment 714 are arranged in this order from the front in the rotation direction of the mesh 31, and are provided in the radial direction of the mesh 31.

By sucking the defibrated material M4 on the mesh 31 from the second suction port 71 having such a shape, the defibrated material M4 can be collected in the rotation direction of the mesh 31.

In this way, the second suction portion 7 functions as a collection suction portion that sucks and collects the defibrated material M4 that is a material accumulated on the first surface 311 of the mesh 31. The collection by suction is performed, so that the defibrated material M4 can be collected without contact, and damage to the defibrated material M4 can be reduced.

By such a separation device 1, the defibrated material M3 becomes the defibrated material M4 which contains a fiber equal to or longer than a desired length and from which foreign matter is removed, and is transported downstream to form the sheet S with high quality.

The controller 28 includes a central processing unit (CPU) 281 and a storage 282. For example, the CPU 281 can make various determinations and various commands.

The storage 282 stores various programs, such as a program related to foreign matter separation or a program for manufacturing the sheet S, calibration curves to be described later, and the like.

The controller 28 may be built in the sheet manufacturing apparatus 100 or may be provided in an external device such as an external computer. In this case, the communication between the external device and the sheet manufacturing apparatus 100 may be wireless communication or wired communication.

Further, for example, the CPU 281 and the storage 282 may be integrated as a single unit, the CPU 281 may be built in the sheet manufacturing apparatus 100 and the storage 282 may be provided in an external device such as an external computer, or the storage 282 may be built in the sheet manufacturing apparatus 100 and the CPU 281 may be provided in an external device such as an external computer.

Incidentally, the thickness of the defibrated material M3 accumulated on the mesh 31 may be uneven depending on the thickness of the raw material M1, the set amount of fixed-amount supply in the coarse crushing section 12, and the like. There is a tendency that the greater the thickness of the defibrated material M3 on the mesh 31, the more insufficient the suction by the first suction portion 5. On the other hand, the thinner the thickness of the defibrated material M3 on the mesh 31, the better the suction by the first suction portion 5 can be. In this way, the degree of suction to the defibrated material M3 fluctuates depending on the thickness of the defibrated material M3 on the mesh 31, and as a result, unevenness occurs in the degree of foreign matter removal. In order to solve such problems, the controller 28 performs the following control.

As shown in FIG. 5, in step S101, first, each section of the sheet manufacturing apparatus 100 is operated to start sheet manufacturing. Before the defibrated material M3 is supplied from the first ejection portion 4, in the separation device 1, the mesh 31 is rotated and the first ejection portion 4, the first suction portion 5, the second ejection portion 6, and the second suction portion 7 are operated. Accordingly, a state in which the air is ejected or sucked through the openings of the above portions is created.

In step S102, the weight of the coarsely crushed piece M2 per unit time is detected in the coarse crushing section 12. That is, the weight of the coarsely crushed piece M2 per unit time supplied to the defibrating section 13 is detected. In the present embodiment, as described above, the weight of the coarsely crushed piece M2 in the fixed-amount supply section 123 of the coarse crushing section 12 is detected.

Next, in step S103, the rotation speed of the rotating member 3 is determined, that is, the conditions for energizing the motor coupled to the mesh 31 are determined. In the present embodiment, the rotation speed of the rotating member 3 is determined based on the calibration curve stored in the storage 282. The calibration curve is derived in advance in order to secure an appropriate suction time according to a supply amount of the coarsely crushed piece M2, and shows the relationship between the supply amount of the coarsely crushed piece M2 and the rotation speed of the rotating member 3.

In step S103, the rotation speed of the mesh 31 is determined based on the weight of the coarsely crushed piece M2 detected in step S102 and the calibration curve.

Note that the rotation speed of the mesh 31 may be determined based on, for example, a table showing the relationship between the supply amount of the coarsely crushed piece M2 and the rotation speed of the mesh 31, without being limited to the calibration curve.

Then, in step S104, it is executed. That is, the motor is driven to rotate the mesh 31 at the rotation speed determined in step S103.

In step S105, it is determined whether or not the program related to sheet manufacturing is completed. The determination in this step is made, for example, based on whether or not the number of manufactured sheets S has reached the target number. In step S105, when it is determined that the program is not completed, the process returns to step S102, and the subsequent steps are sequentially repeated.

Thus, in the separation device 1, the rotation speed of the mesh 31 is adjusted according to the weight of the coarsely crushed piece M2. When the weight of the coarsely crushed piece M2 supplied to the defibrating section 13 per unit time fluctuates, the thickness of the defibrated material M3 supplied onto the mesh 31 fluctuates, and thus the suction of the first suction portion 5 may become insufficient or excessive. However, according to the present disclosure, the rotation speed can be adjusted according to the thickness of the defibrated material M3, and the total suction time can be adjusted. Therefore, regardless of the weight of the coarsely crushed piece M2, the ability to remove foreign matter can be made constant as much as possible. As a result, the whiteness of the defibrated material M4, and thus the whiteness of the manufactured sheet S, can be stabilized.

As described above, the separation device 1 includes: the raw material supply section 11 and the coarse crushing section 12 that are material supply sections that supply a material containing a fiber; the defibrating section 13 that defibrates the coarsely crushed piece M2 which is an example of the material supplied from the coarse crushing section 12; the separation section 10 that includes the rotating member 3, the first suction portion 5 which is a suction portion, and the second ejection portion 6 and the second suction portion 7 which are examples of a collection section, the rotating member 3 having the first surface 311 and the second surface 312 that are in a front and back relationship, being at least partially composed of the mesh 31, and to which the defibrated material M3 generated in the defibrating section 13 is supplied onto the first surface 311, the first suction portion 5 being provided on the side of the second surface 312 of the rotating member 3 and sucking the defibrated material M3 via the mesh 31 to remove foreign matter, the second ejection portion 6 and the second suction portion 7 collecting the defibrated material M4 from which the foreign matter on the first surface 311 has been removed; the weight detection section 8 that detects a weight of the coarsely crushed piece M2 supplied by the coarse crushing section 12; and the controller 28 that controls an operation of the separation section 10 based on a detection result of the weight detection section 8. Accordingly, regardless of the weight of the material supplied to the defibrating section 13, the ability to remove foreign matter in the separation section 10 can be made constant as much as possible. Therefore, the whiteness of the defibrated material M4 collected in the separation section 10, and thus the whiteness of the manufactured sheet S, can be stabilized.

Also, the controller 28 adjusts the rotation speed of the rotating member 3 based on the detection result of the weight detection section 8. Accordingly, the thickness of the defibrated material M3 on the rotating member 3 can be made constant as much as possible by a simple control of adjusting the rotation speed of the rotating member 3, and the ability to remove foreign matter can be stabilized.

In addition, the controller 28 increases the rotation speed of the rotating member 3 as a supply amount of the coarsely crushed piece M2, which is an example of the material, per unit time increases, and decreases the rotation speed of the rotating member 3 as a supply amount of the coarsely crushed piece M2 per unit time decreases. Accordingly, the thickness of the defibrated material M3 on the rotating member 3 can be made constant as much as possible, and the ability to remove foreign matter can be stabilized.

The controller 28 also includes the storage 282 in which a calibration curve indicating the relationship between the supply amount of the coarsely crushed piece M2, which is an example of the material, and the rotation speed of the rotating member 3 is stored. Accordingly, the rotation speed of the rotating member 3 can be set accurately according to the supply amount of the coarsely crushed piece M2.

The coarse crushing section 12, which is a material supply section, includes the fixed-amount supply section 123 that quantitatively supplies the coarsely crushed piece M2, which is a material, and the weight detection section 8 is provided in the fixed-amount supply section 123. Accordingly, the material supplied to the defibrating section 13 can be detected more accurately.

Note that the weight detection section 8 may be provided at a location other than the fixed-amount supply section 123 without being limited to the above configuration. For example, the weight detection section 8 may be provided in the raw material supply section 11 and configured to detect the weight of the raw material M1.

Second Embodiment

FIG. 6 is a flowchart for describing a control operation performed by the controller provided in the separation device according to the first embodiment of the present disclosure.

Hereinafter, a separation device according to the second embodiment of the present disclosure will be described with reference to FIG. 6, but the description will focus on the differences from the above-described embodiment, and the description of the same matters will not be repeated.

The present embodiment differs from the first embodiment only in the control of step S103 (step S203), and the other steps are the same as those of the first embodiment.

As shown in FIG. 6, in step S203, the suction force of the first suction portion 5 is determined, that is, the conditions for energizing the blower 262 are determined. In the present embodiment, the suction force of the first suction portion 5 is determined based on the calibration curve stored in the storage 282. The calibration curve is derived in advance in order to secure an appropriate suction force according to a supply amount of the coarsely crushed piece M2, and shows the relationship between the supply amount of the coarsely crushed piece M2 and the suction force of the first suction portion 5.

In step S203, the suction force of the first suction portion 5 is determined based on the weight detected in step S102 and the calibration curve.

In this way, in the separation device 1, the controller 28 adjusts the suction force of the first suction portion 5 which is a suction portion based on the detection result of the weight detection section 8. Accordingly, the thickness of the defibrated material M3 on the rotating member 3 can be made constant as much as possible by a simple control of adjusting the suction force of the first suction portion 5, and the ability to remove foreign matter can be stabilized.

In addition, the controller 28 increases the suction force of the first suction portion 5, which is a suction portion, as a supply amount of the coarsely crushed piece M2, which is an example of the material, per unit time increases, and weakens the suction force of the first suction portion 5 as a supply amount of the coarsely crushed piece M2 per unit time decreases. Accordingly, the thickness of the defibrated material M3 on the rotating member 3 can be made constant as much as possible, and the ability to remove foreign matter can be stabilized.

The controller 28 also includes the storage 282 in which a calibration curve indicating the relationship between the supply amount of the coarsely crushed piece M2, which is an example of the material, and the suction force of the first suction portion 5, which is a suction portion, is stored. Accordingly, the suction force of the first suction portion 5 can be set accurately according to the supply amount of the coarsely crushed piece M2.

Further, the operating conditions of the second ejection portion 6 and the second suction portion 7, that is, the collection conditions thereof may be controlled to be adjusted in accordance with the adjustment of the above separation conditions.

Hereinbefore, the separation device according to the present disclosure has been described with reference to the illustrated embodiment, but the present disclosure is not limited thereto and each section constituting the separation device can be replaced with any section that can exhibit the same function. Further, any components may be added.

The separation device according to the present disclosure may be a combination of any two or more configurations or features of the above embodiments.

In each of the above-described embodiments, the material supply section includes a raw material supply section and a coarse crushing section. However, the present disclosure is not limited thereto, and the material supply section may be composed of, for example, a cartridge that supplies the coarsely crushed piece.

Note that, in the above embodiment, the rotating member has a circular shape in plan view and rotates around the central axis, but the present disclosure is not limited thereto. For example, the mesh includes an endless belt, and may be configured to be wound around a plurality of rollers to rotate around the rollers in a circular manner.

In the description of the above embodiment, the first ejection port, the first suction port, the second ejection port, and the second suction port each have a curved shape surrounded by two circular arcs and two straight lines, but the present disclosure is not limited thereto. For example, any shape such as a rectangle, a polygon, or a circle may be used.

Further, the first ejection port, the first suction port, the second ejection port, and the second suction port may have a plurality of openings. In this case, it is preferable that the number of openings increases as going to the outer peripheral side of the mesh.

The shapes of the first ejection port, the first suction port, the second ejection port, and the second suction port are not limited to the illustrated configuration, and any shape may be used. However, when the opening is divided by a circular arc passing through the midpoint of the opening surface in the radial direction of the mesh, the outer peripheral portion preferably has a larger area than the inner peripheral portion. The circular arc referred to here is a curvature along the outer edge of the mesh.

What is claimed is:

1. A sheet manufacturing apparatus comprising:
    a material supply section that supplies a material containing a fiber;
    a defibrating section that defibrates the material supplied from the material supply section to generate a defibrated material;
    a separation device that is arranged downstream relative to the defibrating section in a transporting direction of the defibrated material and includes
        a separation section that includes
            a rotating member that has a plate shape, includes a first surface and a second surface that are in a front and back relationship, and is at least partially composed of a mesh, and to which the defibrated material is supplied onto the first surface, the rotating member being rotatable in a rotation axis of the rotating member, the rotation axis extending along a direction perpendicular to the first surface,
            a suction portion being provided on a side of the second surface of the rotating member and sucking the defibrated material via the mesh to remove foreign matter, and
            a collection section collecting the defibrated material from which the foreign matter on the first surface was removed;
    a weight detection section that detects a weight of the material supplied by the material supply section;
    a controller that controls an operation of the separation section based on a detection result of the weight detection section;
    a loosening section that is arranged downstream relative to the separation device in the transporting direction and includes a sieve which loosens the defibrated material collected by the collection section;
    a web forming section that accumulates, on a belt that faces the loosening section, the defibrated material loosened at the loosening section, thereby forming a web; and
    a sheet forming section forming a sheet by cutting the web.

2. The sheet manufacturing apparatus according to claim 1, wherein
    the controller adjusts a rotation speed of the rotating member based on the detection result of the weight detection section.

3. The sheet manufacturing apparatus according to claim 2, wherein
    the controller increases the rotation speed of the rotating member as a supply amount of the material per unit time increases, and decreases the rotation speed of the rotating member as a supply amount of the material per unit time decreases.

4. The sheet manufacturing apparatus according to claim 2, wherein
    the controller includes a storage in which a calibration curve indicating a relationship between a supply amount of the material and the rotation speed of the rotating member is stored.

5. The sheet manufacturing apparatus according to claim 1, wherein
    the controller adjusts a suction force of the suction portion based on the detection result of the weight detection section.

6. The sheet manufacturing apparatus according to claim 5, wherein
    the controller increases the suction force of the suction portion as a supply amount of the material per unit time increases, and weakens the suction force of the suction portion as a supply amount of the material per unit time decreases.

7. The sheet manufacturing apparatus according to claim 5, wherein
    the controller includes a storage in which a calibration curve indicating a relationship between a supply amount of the material and the suction force of the suction portion is stored.

8. The sheet manufacturing apparatus according to claim 1, wherein
    the material supply section includes a fixed-amount supply section that supplies the material quantitatively, and
    the weight detection section is provided in the fixed-amount supply section.

9. The sheet manufacturing apparatus according to claim 1, wherein
    the collection section collects the defibrating material by peeling off the defibrating material using an air flow from the side of the second surface.

* * * * *